(12) United States Patent
Sandoval et al.

(10) Patent No.: US 10,458,258 B2
(45) Date of Patent: Oct. 29, 2019

(54) DOUBLE SNAPPED COVER PLATE FOR ROTOR DISK

(71) Applicant: United Technologies Corporation, Hartford, CT (US)

(72) Inventors: Jonathan Perry Sandoval, Hebron, CT (US); Raymond S. Hummel, South Windsor, CT (US); Scott D. Virkler, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 711 days.

(21) Appl. No.: 14/764,021

(22) PCT Filed: Jan. 30, 2013

(86) PCT No.: PCT/US2013/023718
§ 371 (c)(1),
(2) Date: Jul. 28, 2015

(87) PCT Pub. No.: WO2014/120135
PCT Pub. Date: Aug. 7, 2014

(65) Prior Publication Data
US 2015/0369061 A1    Dec. 24, 2015

(51) Int. Cl.
*F01D 1/00*    (2006.01)
*F01D 5/30*    (2006.01)
(Continued)

(52) U.S. Cl.
CPC .......... *F01D 5/3015* (2013.01); *F01D 5/082* (2013.01); *F02C 3/04* (2013.01); *F04D 29/321* (2013.01);
(Continued)

(58) Field of Classification Search
CPC ...... F01D 5/3015; F01D 5/085; F01D 11/001; F01D 5/081; F01D 5/082; F01D 25/12; F02C 7/18; F02C 7/20; F02C 7/28
See application file for complete search history.

(56) References Cited

U.S. PATENT DOCUMENTS 3,748,060 A    7/1973  Hugoson et al.
4,344,740 A *  8/1982  Trenschel ............. F01D 5/3015
                                                    416/193 A
(Continued)

FOREIGN PATENT DOCUMENTS

DE    60318977    2/2009
EP    1277917     1/2003
EP    2009236     12/2008

OTHER PUBLICATIONS

International Preliminary Report on Patentability for PCT Application No. PCT/US2013/023718, dated Aug. 13, 2015.
(Continued)

*Primary Examiner* — Craig Kim
*Assistant Examiner* — Edwin Kang
(74) *Attorney, Agent, or Firm* — Carlson, Gaskey & Olds, P.C.

(57) ABSTRACT

According to an exemplary embodiment of this disclosure, among other possible things a gas turbine engine includes a compressor section, a combustor in fluid communication with the compressor section, a turbine section in fluid communication with the combustor section, a plurality of turbine disks in at least one of the compressor section and the turbine sections, at least one cover plate corresponding to at least one of the turbine disks, each of the cover plates includes, at least two snaps connected via a webbing portion, and a bore region radially inward of the at least two snaps and connected to at least one of the at least two snaps via the webbing portion.

19 Claims, 6 Drawing Sheets

(51) Int. Cl.
*F01D 5/08* (2006.01)
*F04D 29/32* (2006.01)
*F02C 3/04* (2006.01)
*F01D 11/00* (2006.01)
*F02C 7/28* (2006.01)

(52) U.S. Cl.
CPC .............. *F01D 11/001* (2013.01); *F02C 7/28* (2013.01); *F05D 2260/30* (2013.01); *F05D 2260/36* (2013.01); *Y02T 50/676* (2013.01)

(56) References Cited

U.S. PATENT DOCUMENTS

| | | | |
|---|---|---|---|
| 4,558,988 A | 12/1985 | Kisling et al. | |
| 4,701,105 A * | 10/1987 | Cantor | F01D 5/3015 416/220 R |
| 4,820,116 A * | 4/1989 | Hovan | F01D 1/32 415/115 |
| 5,310,319 A | 5/1994 | Grant et al. | |
| 5,472,313 A * | 12/1995 | Quinones | F01D 5/082 415/115 |
| 5,498,139 A | 3/1996 | Williams | |
| 5,622,475 A * | 4/1997 | Hayner | F01D 5/3015 416/219 R |
| 5,816,776 A * | 10/1998 | Chambon | F01D 5/066 415/174.4 |
| 6,077,035 A | 6/2000 | Walters et al. | |
| 6,190,131 B1 | 2/2001 | Deallenbach | |
| 8,038,397 B2 | 10/2011 | Saddoughi et al. | |
| 8,167,547 B2 | 5/2012 | Wu et al. | |
| 8,277,177 B2 | 10/2012 | Liang | |
| 2004/0042900 A1 * | 3/2004 | Dougherty | F01D 5/081 416/97 R |
| 2005/0095129 A1 | 5/2005 | Benjamin et al. | |
| 2009/0304509 A1 * | 12/2009 | Blanchard | F01D 5/027 416/144 |
| 2012/0177485 A1 | 7/2012 | Virkler et al. | |
| 2014/0086727 A1 * | 3/2014 | Xu | F01D 5/082 415/116 |

OTHER PUBLICATIONS

International Search Report and Written Opinion for Application No. PCT/US2013/023718 dated Mar. 28, 2013.
Extended European Search Report for Application No. 13873325.8 dated Jan. 26, 2016.

* cited by examiner

DOUBLE SNAPPED COVER PLATE FOR ROTOR DISK

TECHNICAL FIELD

The present disclosure is related to gas powered turbine engines and more specifically toward rotor disk cover plates for rotor systems in the same.

BACKGROUND OF THE INVENTION

Gas power turbine engines, such as those used as commercial or military jet engines, utilize multiple stages including turbine stages and compressor stages. Compressor systems and turbine systems within a gas powered turbine engine are collectively referred to as rotor systems and include multiple rotating disks referred to as rotor disks.

The rotor systems within the turbine engine use sealing mechanisms near a gas path rim of each of the rotor disks to prevent secondary air system air from entering the gas path. Typical sealing mechanisms involve a rotating to static hardware seal. The gap between the rotating piece and the static piece of the rotating to static seal directly affects the amount of gasses that across the gap and affect engine performance.

One type of seal utilized in rotor systems is a knife edge seal having a knife edge protrusion as the rotating piece in the seal arrangement. The knife edge protrusion is connected to the rotor disk via a cover plate The knife edge protrusion interfaces with a corresponding static component to form a seal and minimize gas leakage between the secondary air systems and the gas path. The knife edge seals are connected to the rotor disks by the cover plate. The cover plates are intentionally made small relative to the rotor disks in order to minimize the centrifugal load imparted to the rotors on which the cover plates are attached.

SUMMARY OF THE INVENTION

According to an exemplary embodiment of this disclosure, among other possible things a gas turbine engine includes a compressor section, a combustor in fluid communication with the compressor section, a turbine section in fluid communication with the combustor section, a plurality of turbine disks in at least one of the compressor section and the turbine sections, at least one cover plate corresponding to at least one of the turbine disks, each of the cover plates includes, at least two snaps connected via a webbing portion, and a bore region radially inward of the at least two snaps and connected to at least one of the at least two snaps via the webbing portion.

In a further embodiment of the foregoing gas turbine engine, a first snap of the at least two snaps is tight fit with the rotor disk, and a second snap of the at least two snaps is loose fit when the cover plate is cool relative to the corresponding rotor disk and tight fit when the cover plate is hot relative to the corresponding rotor disk.

In a further embodiment of the foregoing gas turbine engine, the bore region is axially thicker than the webbing, and the bore region provides mechanical restraint on radial growth and reduces load into rotor disk.

In a further embodiment of the foregoing gas turbine engine, each of the snaps includes a contacting surface contacting the rotor disk, and the contacting surface is scalloped.

In a further embodiment of the foregoing gas turbine engine, a scalloping on the first of the snaps contacting surface is a small scalloping.

In a further embodiment of the foregoing gas turbine engine, the first of the snaps is a radially outermost snap.

In a further embodiment of the foregoing gas turbine engine, a scalloping on the second of the snaps contacting surface is large scalloping.

In a further embodiment of the foregoing gas turbine engine, the second of the snaps is a radially innermost snap.

A further embodiment of the foregoing gas turbine engine includes at least one ducting gap between the cover plate and the rotor disk.

In a further embodiment of the foregoing gas turbine engine, the at least one ducting gap comprises a first ducting gap radially outward of a first snap, a second ducting gap radially between the first snap and the second snap, and a third ducting gap radially inward of the second snap.

In a further embodiment of the foregoing gas turbine engine, the first ducting gap is fluidly connected to the second ducting gap via scalloping on the first snap.

In a further embodiment of the foregoing gas turbine engine, the second ducting gap is fluidly connected to the third ducting gap via scalloping on the second snap.

In a further embodiment of the foregoing gas turbine engine, air in the duct region is scrub air, and the scrub air originates from a secondary air source.

In a further embodiment of the foregoing gas turbine engine, scalloping on the first snap is a metering component operable to meter airflow into the ducting gaps.

According to an exemplary embodiment of this disclosure, among other possible things, a cover plate for a rotor disk includes, at least two snaps connected via a webbing portion, and a bore region radially inward of the at least two snaps and connected to at least one of the at least two snaps via the webbing portion.

In a further embodiment of the foregoing cover plate for a rotor disk, the bore region is axially thicker than the webbing, and the bore region provides mechanical restraint on radial growth and reduces load into rotor disk.

In a further embodiment of the foregoing cover plate for a rotor disk, each of the snaps includes a contacting surface contacting the rotor disk, and the contacting surface is scalloped.

In a further embodiment of the foregoing cover plate for a rotor disk, a scalloping on the first of the snaps contacting surface is a small scalloping.

In a further embodiment of the foregoing cover plate for a rotor disk, the first of the snaps is a radially outermost snap.

In a further embodiment of the foregoing cover plate for a rotor disk, a scalloping on the second of the snaps contacting surface is large scalloping.

In a further embodiment of the foregoing cover plate for a rotor disk, the second of the snaps is a radially innermost snap.

These and other features may be best understood from the following specification and drawings, the following which is a brief description.

BRIEF DESCRIPTION OF THE DRAWINGS

FIG. 7b schematically illustrates a three-dimensional isometric view of a slot portion of the bore region of FIG. 7a.

DETAILED DESCRIPTION

Figure 1:
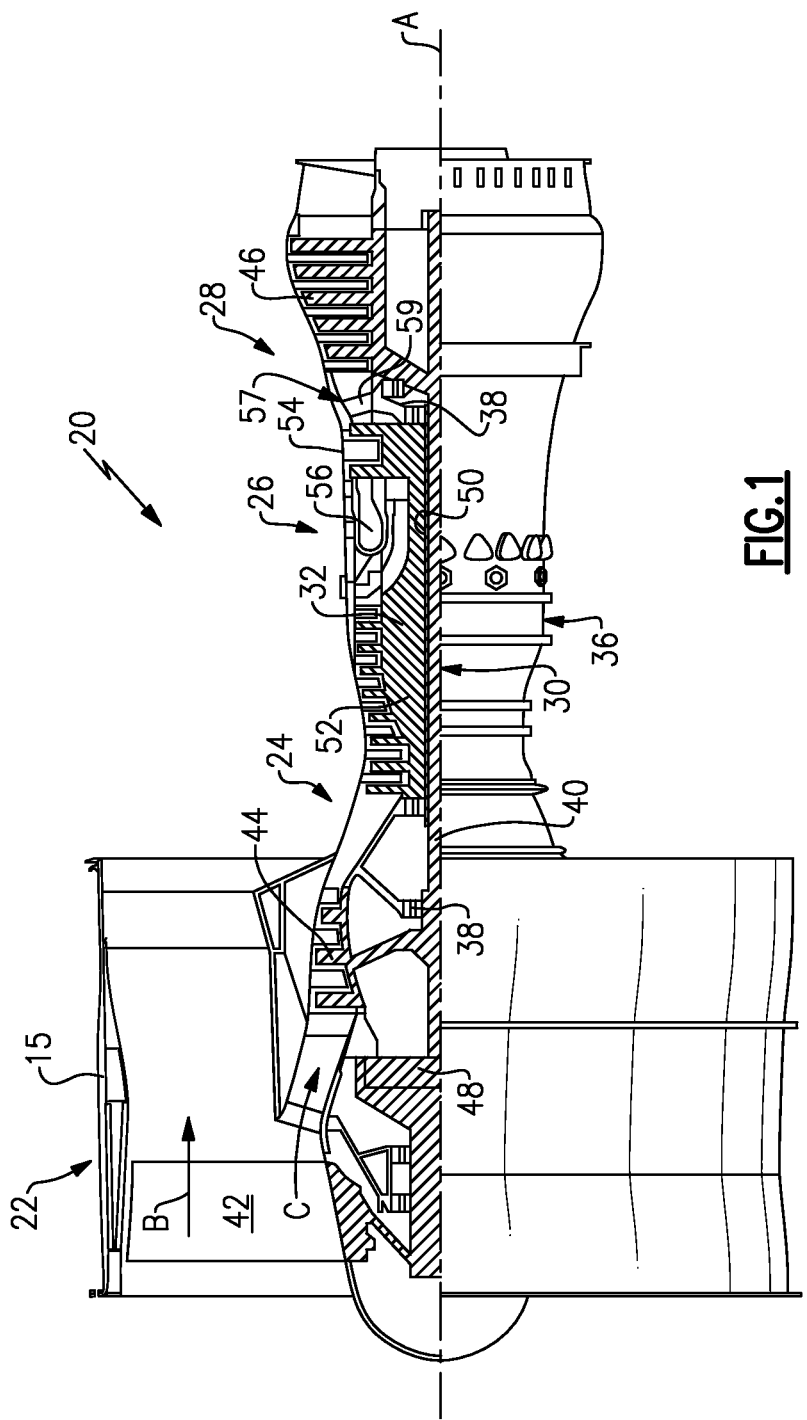
FIG. 1 schematically illustrates a gas powered turbine engine for an aircraft.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures, ground based turbine engines, or military engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes. The systems connected to, and rotating along with, the inner shaft 40 and the outer shaft 50 are collectively referred to as rotor systems.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

Figure 2:
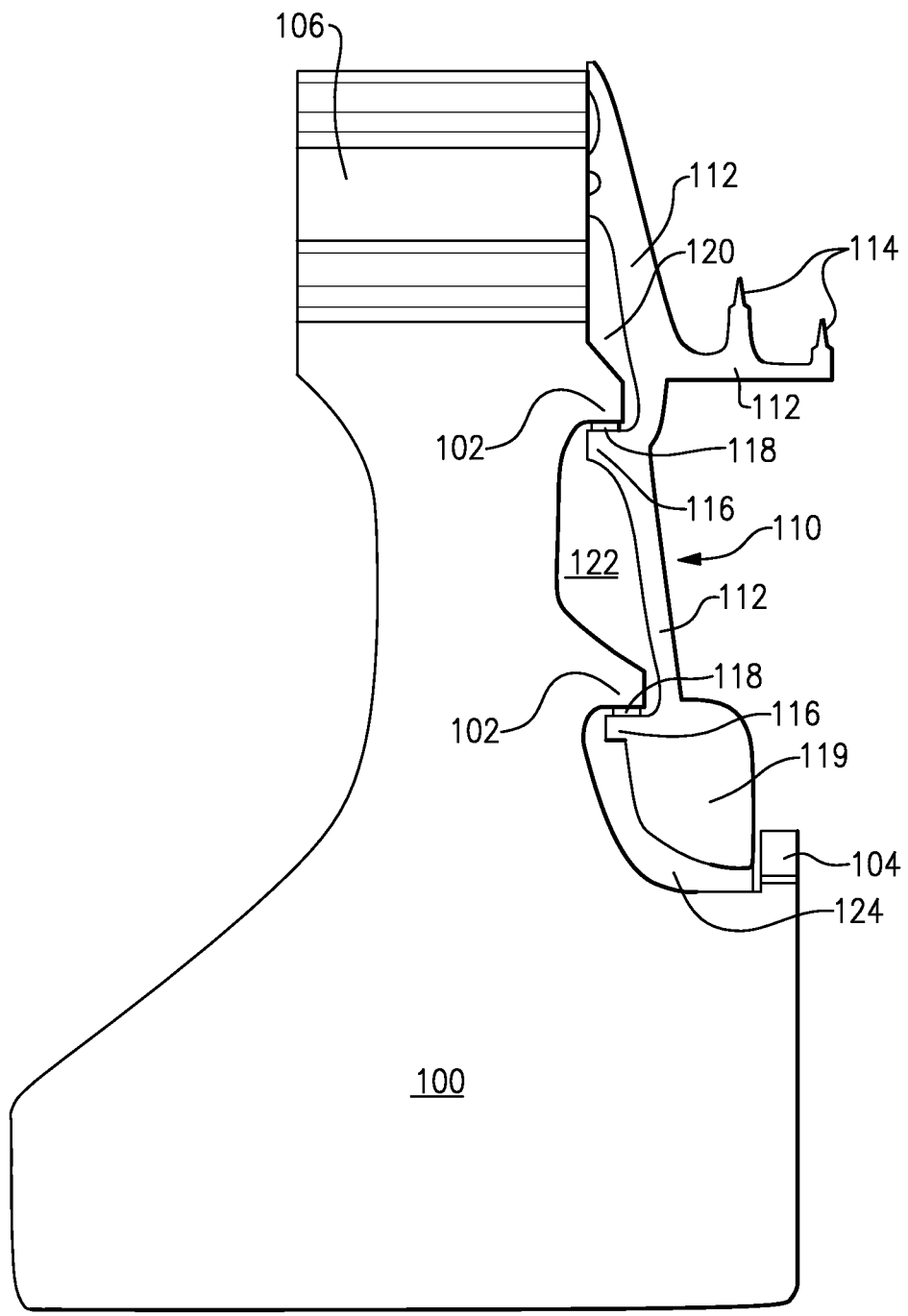
FIG. 2 schematically illustrates a partial cross-sectional view of a rotor disk assembly.

FIG. 2 illustrates a cross-sectional view of a rotor disk 100 that can be used in the rotor systems of the gas turbine engine illustrated in FIG. 1. The rotor disk 100 includes multiple snap retaining features 102, and a rotor disk interlocking feature 104. The rotor disk 100 also includes a blade connection region 106 at a radially outward edge of the rotor disk 100.

Connected to the aft side of the rotor disk 100 is a rotor disk cover plate 110. The rotor disk cover plate 110 includes two snaps 116 for retaining the cover plate 110 in position and preventing the cover plate 110 from shifting radially during operation of the gas turbine engine 20. The cover plate 110 also includes two knife edges 114 for a standard knife edge sealing arrangement and a webbing 112 connecting the snaps 116 and the knife edges 114. Connected to the radially innermost snap 116 is a bore region 119 of the cover plate 110. The bore region 119 is axially thicker than the remainder of the cover plate 110. The additional mass of the bore 119 provides mechanical restraint on the radial growth of the cover plate 110, reducing the radial load it imparts to the rotor disk 100. In an alternate example, the bore region 119 is separate from the radially inner snap 116 and connected to the snap 116 via additional webbing 112. Alternate coverplates can have "HALO" seals, brush seals, or no seal other than the disk rim sealing.

Multiple duct regions 120, 122, 124 are defined and bounded by the webbing 112 of the cover plate 110 and the aft surface of the rotor disk 100. Each of the ducted regions 120, 122, 124 is fluidly connected to the adjacent ducted regions 120, 122, 124 via a scalloping feature 118 on a contact surface of the snap 116.

The bore region 119 interfaces with a rotor disk interlocking slot feature 104 to prevent the rotor disk cover plate 110 from rotating about the engine center line axis. In some examples, the rotor disk interlocking slot feature 104 also interfaces with an interlocking feature on an adjacent rotor disk. The interfacing with an adjacent rotor disk is described below with regards to FIGS. 7a, 7b, and 7c.

Figure 3:
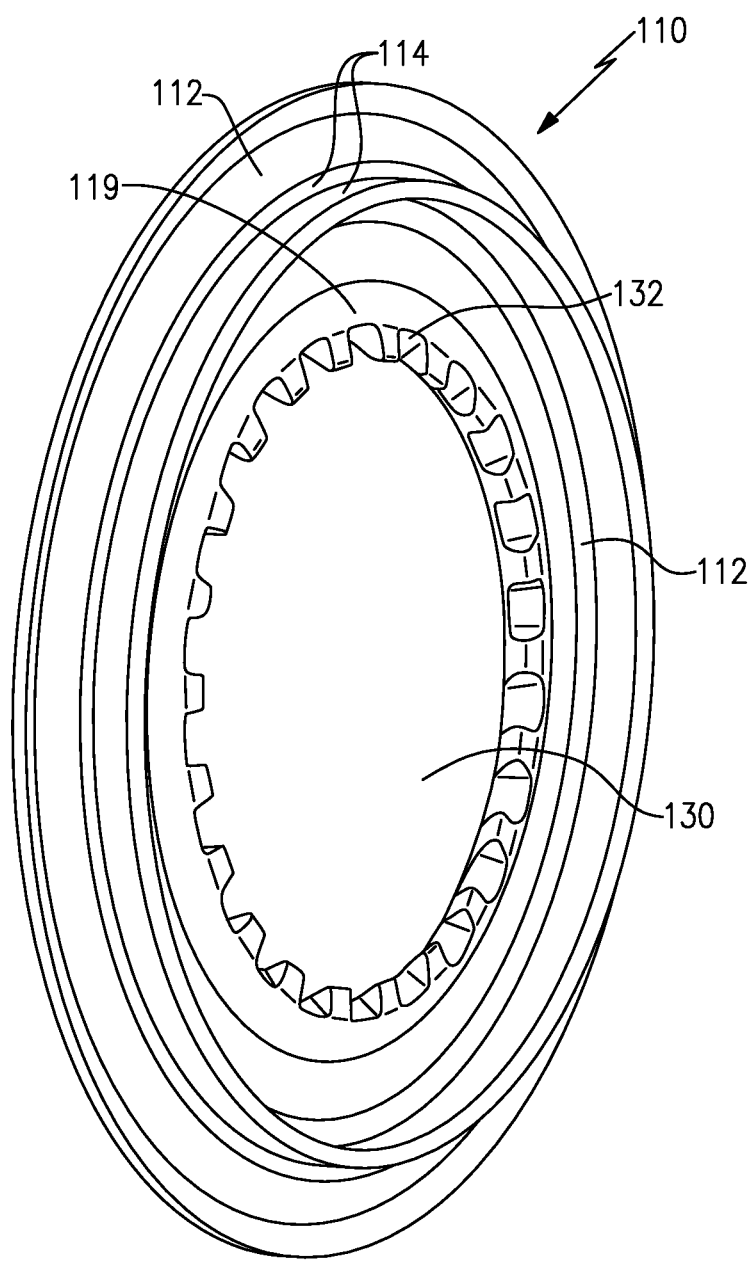
FIG. 3 schematically illustrates a three-dimensional isometric view of the cover plate of the rotor disk assembly of FIG. 2.

FIG. 3 schematically illustrates a three-dimensional isometric view of the cover plate 110. The cover plate 110 is a generally cylindrical shape with a central opening 130. The central opening 130 is coaxial with the cover plate 110. The cover plate 110 includes multiple slots 132 corresponding to the rotor disk interlocking slot retention feature 104. The slots 132 are distributed about the inner radius of the cover plate 110 and allow for a locking feature to prevent the cover plate 110 from rotating relative to the rotor disk 100 as described below with regards to FIGS. 7a, 7b, and 7c.

The three-dimensional view of FIG. 3 also illustrates knife edges 114 for the knife edge sealing arrangement, the webbing 112 and the bore region 119. Each of these features is continuous radially about the cover plate 110. Each of the snap features 116 is located on the reverse side of FIG. 3. Each of the snap features 116 is also continuous radially about the cover plate 110.

Figures 4, 5:
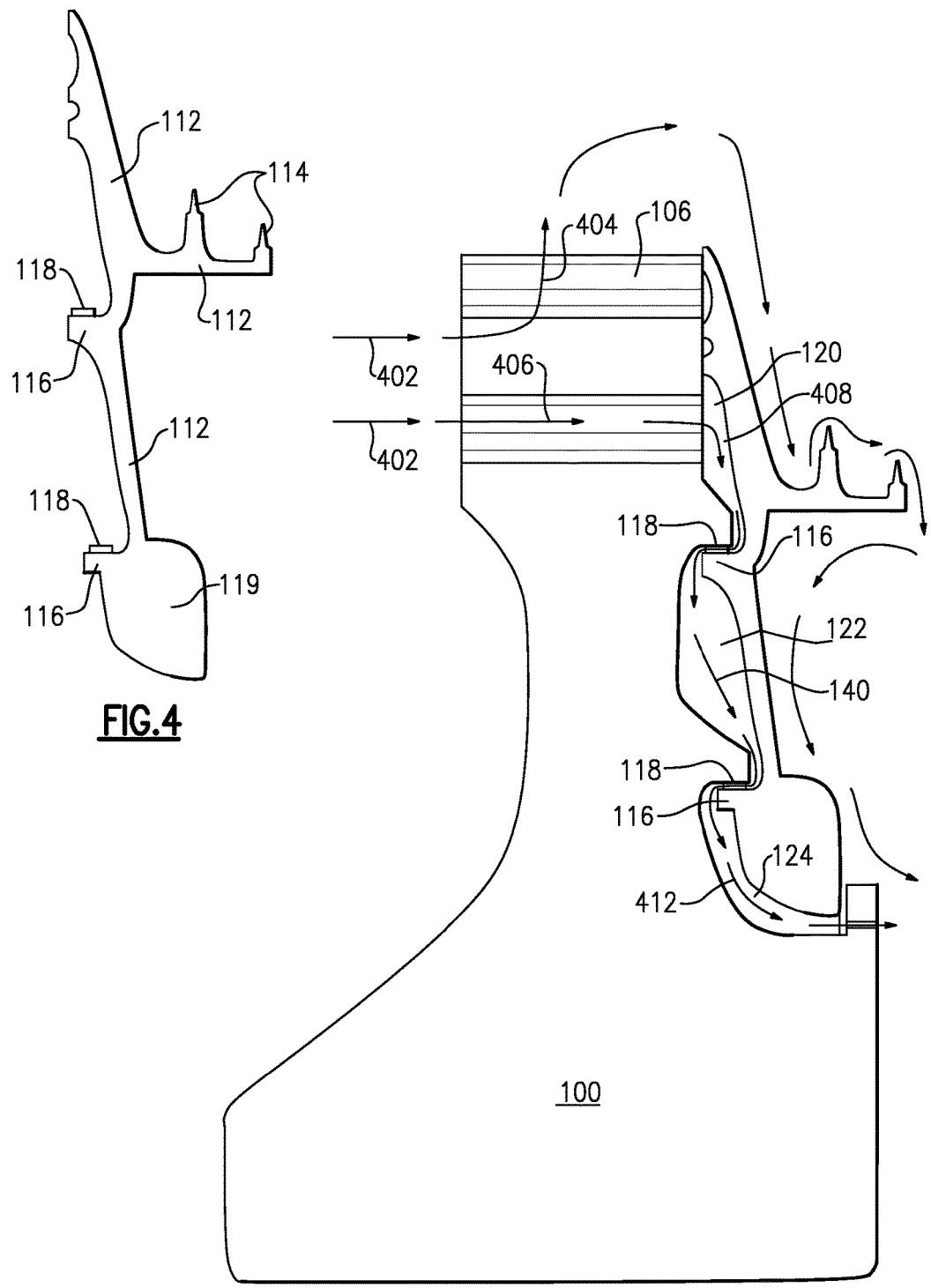
FIG. 4 schematically illustrates a cross-sectional view of the cover plate of the rotor disk assembly of FIG. 2.
FIG. 5 schematically illustrates airflow through a rotor disk assembly during operation of a gas turbine engine.

FIG. 4 schematically illustrates a cross-section of the cover plate 110 isolated from the rotor disk 100, with like numerals indicating like elements. Each of the snaps 116 includes a scalloped surface 118 that directly contacts an opposing surface on the snap retaining features 102. The scalloping dent, or thumbnail indent, in the scalloped surface 118 allows air to pass between the snap 116 and the opposing surface of the corresponding snap retaining feature 102 while still maintaining contact between the snap 116 and the snap retaining feature 102. While illustrated herein as raised surfaces for illustrative purposes, in a practical implementation the scalloping of the scalloped surface 118 protrudes into the snap.

During standard operation of the turbine engine 10, engine components heat up to extreme temperatures. As the engine heats up, the components expand due to thermal expansion. Engine components with a smaller mass heat up and expand faster than engine components with a larger mass. The cover plate 110 has a significantly smaller mass than the rotor disk 100 to which it is attached, and thus expands and contracts faster than the rotor disk 100, leading to excessive loading into the rotor disk 100. This disparity in temperature response is partially offset by the bore region 119 which adds mass to the part, decreasing the rate of heat up and expansion, thus reducing the load into the rotor disk 100.

When the turbine engine 20 is off, or cool, the radially outer snap 116 is tight against the corresponding snap retaining feature 102 due to a preload. The radially inner snap 116, on the other hand, is loose against the corresponding snap retaining feature 102 while the engine 20 is off or cool. As the engine 20 winds up, the engine 20 gets hotter and the cover plate 110 expands. As the cover plate 110 expands, the snaps 116 get tighter against the contact surfaces of the corresponding snap retaining feature 102. When the radially inner snap 116 becomes tight due to thermal expansion, the load on the radially outward snap 116 is partially transferred to the radially inward snap 116, thereby preventing the radially outward snap from overloading and breaking.

A secondary effect of the inclusion of the cover plate 110 is that the cover plate 110 of standard arrangements shields the rotor disk 100 from exposure to airflow from a secondary air source while simultaneously exposing the cover plate 110 to the airflow. This airflow is referred to as scrub air, and is typically at a different temperature than the gas path air. Because the scrub air only scrubs the cover plate 110 in a standard cover plate arrangement, the disparity in thermal expansion between the rotor disk 100 and the cover plate 110 is exacerbated.

FIG. 5 illustrates an airflow path of scrub air 402 passing through the rotor disk assembly of FIG. 1. Initially the scrub air 402 flows into the blade connection region 106 of the rotor disk 100, in the blade connection region 106, a portion 404 of the scrub air is directed to the blades (not pictured) connected to the radially outward region of the rotor disk 100 via the blade connection region 106. This portion of the scrub air 402 passes over the outside of the cover plate 110 and does not contact the surface of the rotor disk 100. The remainder of the scrub air 402 follows a ducting flow path 406, 408, 410, 412 into a first ducting gap 120 between the cover plate 110 and the rotor disk 100. The scrub air 402 then passes through the scalloping 118 on the radially outward snap 116 into a second ducting region 122. The scrub air 402 then passes through the scalloping 118 on the radially inward snap 116 into a third ducting region 124. Scrub air 402 then flows away from the ducting gap 124 through the rotor disk interlocking slots 104 to an adjacent rotor disk.

By passing the scrub air 402 through the ducting regions 120, 122, 124 both the rotor disk 100 and the cover plate 110 are exposed to the same airflows and the thermal expansion disparity between the rotor disk 100 and the cover plate 110 due to the scrub air is minimized.

Figure 6A:
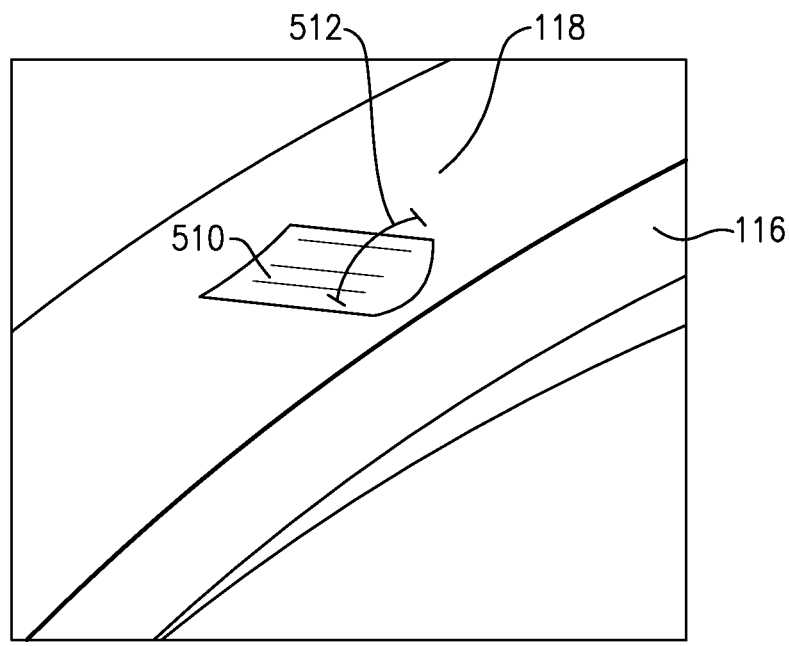
FIG. 6a schematically illustrates a thumbnail scalloping of a radially outer snap of the cover plate of FIG. 2.
Figure 6B:
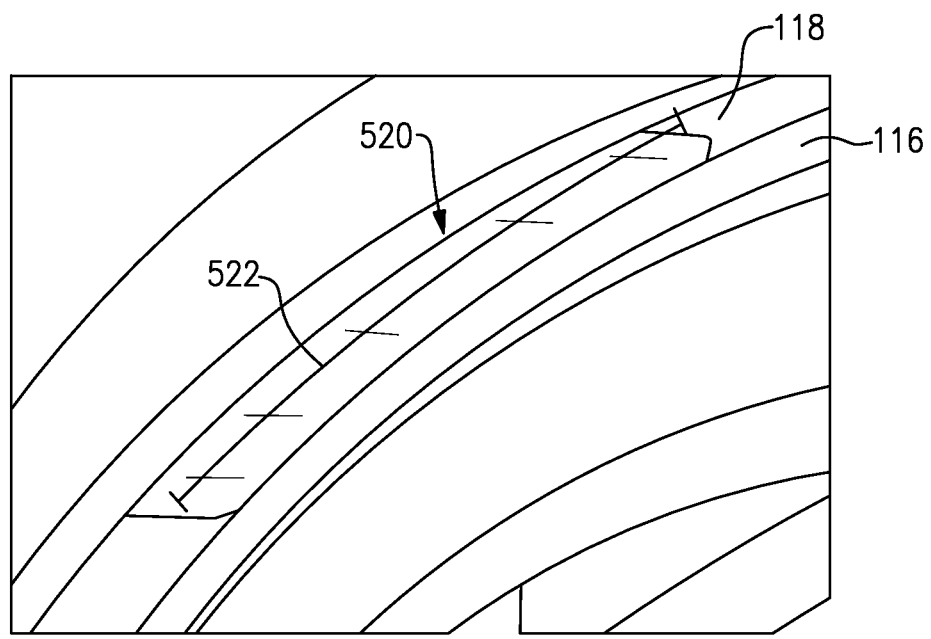
FIG. 6b schematically illustrates a thumbnail scalloping of a radially inner snap of the cover plate of FIG. 2.

The size and depth of the scalloping 118 of the snaps 116 is designed to further improve gas flow through the ducting regions 120, 122, 124. FIG. 6a and FIG. 6b illustrate the scalloping on the scalloped surface 118 of each of the snaps 116, with FIG. 6a illustrating a scalloping feature 510 of the radially outward snap 116 scalloped surface 118 and FIG. 6b illustrating a scalloping feature 520 of the radially inward snap 116 scalloped surface 118. Each of the scalloping features 510, 520 is a thumbnail groove in the scalloped snap surface 118. The thumbnail grooves are reiterated across the entire scalloped surface 118 of the snaps 116.

In order to meter, or control, scrub air 402 flow through the scalloped surfaces 118, the scalloping features 510 of the radially outward snap 116 are small (have a short arc length 512 and a short radial depth) and restrict the volume of gas that can pass through the scalloped feature 510. In contrast, the scalloping feature 520 of the radially inward snap 116 is significantly larger (has a long arc length 522 and/or a large radial depth relative to the radially outward scalloping 118) than the scalloping feature 510 of the radially outward snap 116 and does not provide a meaningful limit on gas flow. Thus, the flow of gas is metered, or controlled, via the scalloping features 510 of the radially outward snap 116.

Figure 7B:
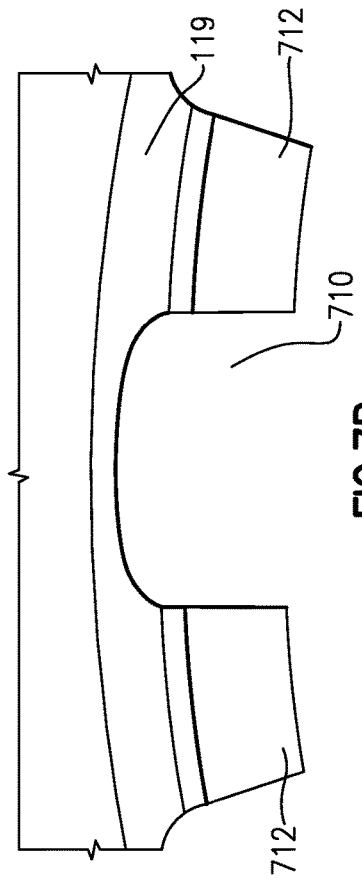
Figure 7C:
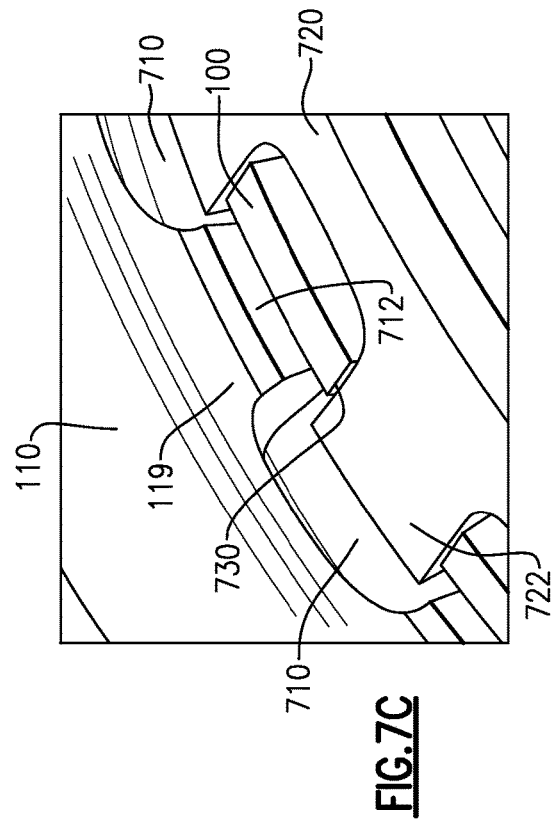
FIG. 7c schematically illustrates the slot portion of FIG. 7b in an assembled position.
Figure 7A:
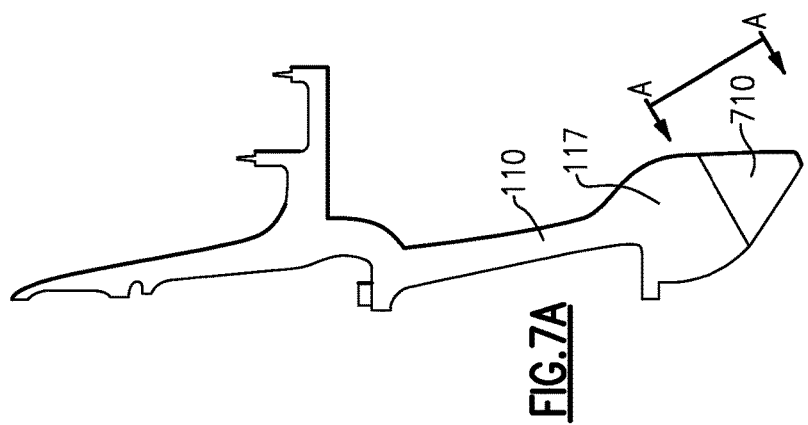
FIG. 7a schematically illustrates a cross-sectional view of the rotor disk cover of FIG. 2.

FIGS. 7a, 7b and 7c illustrate the rotor disk interlocking slot features 104 of FIG. 2 in greater detail. FIG. 7a illustrates a cross-sectional view of the cover plate 110, FIG. 7b illustrates a zoomed in view of the radially inward edge of the bore region 119 of the cover plate 110, and FIG. 7c illustrates the view of FIG. 7b in an installed arrangements.

The bore region 119 of the cover plate 110 includes multiple slots 710 with the interlocking portion of the bore region 119. To install the cover plate 110, tabs 712 are slid through slots 730 and the rotor disk 100 interlocking region. The cover plate 110 is then rotated about the engine centerline axis, and the tabs 712 are aligned with and blocked by portions of the rotor disk interlocking slots 104. A locking component 720 is then placed in the slots 730 to prevent the cover plate 110 from rotating out of position. In some examples, the locking component 720 is a plurality of tabs 722 on an adjacent rotor disk.

While the above disclosure is described with regards to a cover plate 110 in a rotor system for a turbine engine 20, it is understood that the cover plate design can be used in other rotating systems and still fall within this disclosure.

The invention claimed is:

1. A gas turbine engine comprising:
  a compressor section;

a combustor in fluid communication with the compressor section;

a turbine section in fluid communication with the combustor section;

a plurality of rotor disks in at least one of said compressor section and said turbine sections;

at least one cover plate corresponding to at least one rotor disk of said plurality of rotor disks, wherein each of said at least one cover plates comprises:

at least two snaps connected via a webbing portion, each snap of said at least two snaps comprises a contacting surface contacting said at least one rotor disk, and each of said contacting surfaces includes at least one scalloping, the at least one scalloping on the contacting surface of a first snap of said at least two snaps has a first arc length and a first radial depth and the at least one scalloping on the contacting surface of a second snap of said at least two snaps has a second arc length, larger than the first arc length, and a second radial depth, larger than the first radial depth; and a bore region radially inward of said at least two snaps and connected to at least one of said at least two snaps via said webbing portion.

2. The gas turbine engine of claim 1, wherein the first snap of said at least two snaps includes a dimensional interference with said at least one rotor disk of said plurality of rotor disks, and wherein the second snap of said at least two snaps lacks a dimensional interference with a corresponding rotor disk of said at least one rotor disk of said plurality of rotor disks when said at least one cover plate is cool relative to the corresponding rotor disk of said at least one rotor disk of said plurality of rotor disks and includes a dimensional interference with the corresponding rotor disk of said at least one rotor disk of said plurality of rotor disks when said at least one cover plate is hot relative to the corresponding rotor disk of said at least one rotor disk of said plurality of rotor disks.

3. The gas turbine engine of claim 1, wherein said bore region is axially thicker than said webbing portion, and wherein said bore region provides mechanical restraint on radial growth of said at least one cover plate and reduces load into said at least one rotor disk.

4. The gas turbine engine of claim 1, wherein said first snap of said at least two snaps is a radially outermost snap.

5. The gas turbine engine of claim 1, wherein said second snap of said at least two snaps is a radially innermost snap.

6. The gas turbine engine of claim 1, further comprising at least one ducting gap between said at least one cover plate and said rotor disk.

7. The gas turbine engine of claim 6, wherein said at least one ducting gap comprises a first ducting gap radially outward of the first snap, a second ducting gap radially between said first snap and the second snap, and a third ducting gap radially inward of said second snap.

8. The gas turbine engine of claim 7, wherein said first ducting gap is fluidly connected to said second ducting gap via the at least one scalloping on said first snap.

9. The gas turbine engine of claim 7, wherein said second ducting gap is fluidly connected to said third ducting gap via the at least one scalloping on said second snap.

10. The gas turbine engine of claim 6, wherein air in said at least one ducting gap is scrub air, and wherein said scrub air originates from a secondary air source.

11. The gas turbine engine of claim 6, wherein the at least one scalloping on the first snap is a metering component operable to meter airflow into said at least one ducting gap.

12. A cover plate for a rotor disk comprising:

at least two snaps connected via a webbing portion, each snap of said at least two snaps comprises a contacting surface which contact the rotor disk, and each of said contacting surfaces includes at least one scalloping, the at least one scalloping on the contacting surface of a first snap of said at least two snaps has a first arc length and a first radial depth and the at least one scalloping on the contacting surface of a second snap of said at least two snaps has a second arc length, larger than the first arc length, and a second radial depth, larger than the first radial depth; and a bore region radially inward of said at least two snaps and connected to at least one of said at least two snaps via said webbing portion.

13. The cover plate of claim 12, wherein said bore region is axially thicker than said webbing portion, and wherein said bore region provides mechanical restraint on radial growth of said cover plate and reduces load into the rotor disk.

14. The cover plate of claim 12, wherein said first snap of said at least two snaps is a radially outermost snap.

15. The cover plate of claim 12, wherein said second snap of said at least two snaps is a radially innermost snap, relative to an axis defined by the cover plate.

16. The gas turbine engine of claim 1, wherein each of the at least one scalloping is an intrusion into said contact surface corresponding to the at least one scalloping.

17. The gas turbine engine of claim 1, wherein a first coefficient of thermal expansion of the at least one rotor disk is less than a second coefficient of thermal expansion of the at least one cover plate.

18. The gas turbine engine of claim 10 wherein said scrub air passes through a blade connection region of the at least one rotor disk radially outward of the at least two snaps prior to entering the at least one ducting gap.

19. The gas turbine engine of claim 1, wherein each of the at least one cover plates further includes at least one seal element, the at least one seal element being radially outward of the at least two snaps.

* * * * *